United States Patent
Oesch et al.

(10) Patent No.: US 12,149,892 B2
(45) Date of Patent: Nov. 19, 2024

(54) METHOD AND SYSTEM FOR STREAMING A MULTICHANNEL AUDIO SIGNAL TO A BINAURAL HEARING SYSTEM

(71) Applicant: SONOVA AG, Staefa (CH)

(72) Inventors: Yves Oesch, Neuchatel (CH); Amre El-Hoiydi, Neuchâtel (CH); Xavier Gigandet, Stäfa (CH)

(73) Assignee: Sonova AG, Staefa (CH)

( * ) Notice: Subject to any disclaimer, the term of this patent is extended or adjusted under 35 U.S.C. 154(b) by 208 days.

(21) Appl. No.: 17/842,151

(22) Filed: Jun. 16, 2022

(65) Prior Publication Data

US 2022/0408202 A1 Dec. 22, 2022

(30) Foreign Application Priority Data

Jun. 21, 2021 (EP) .................... 21180598

(51) Int. Cl.
| | |
|---|---|
| H04R 25/00 | (2006.01) |
| G06F 3/16 | (2006.01) |
| G10L 19/00 | (2013.01) |
| G10L 19/005 | (2013.01) |
| H04L 65/1059 | (2022.01) |
| H04L 65/61 | (2022.01) |
| H04L 65/70 | (2022.01) |
| H04L 65/75 | (2022.01) |
| H04R 1/10 | (2006.01) |
| H04R 5/033 | (2006.01) |
| H04W 28/02 | (2009.01) |

(52) U.S. Cl.
CPC ........ *H04R 25/552* (2013.01); *G10L 19/0017* (2013.01); *H04R 25/554* (2013.01); *H04R 2420/07* (2013.01)

(58) Field of Classification Search
None
See application file for complete search history.

(56) References Cited

U.S. PATENT DOCUMENTS

| 10,043,523 | B1 | 8/2018 | Zopf | |
|---|---|---|---|---|
| 2015/0201289 | A1* | 7/2015 | Solum ................. | H04W 56/002 381/315 |
| 2015/0319557 | A1* | 11/2015 | El-Hoiydi .......... | H04W 56/001 455/41.2 |

(Continued)

FOREIGN PATENT DOCUMENTS

| CN | 110636487 A | 12/2019 |
|---|---|---|
| EP | 2897384 A2 | 7/2015 |

(Continued)

OTHER PUBLICATIONS

"Extended European Search Report received in EP Application No. 21180598.1 on Dec. 13, 2021."

(Continued)

*Primary Examiner* — Qin Zhu
(74) *Attorney, Agent, or Firm* — ALG Intellectual Property, LLC

(57) ABSTRACT

There is provided a method for streaming a multichannel audio signal comprising a first channel (L) and a second channel (R) from an audio source device to a binaural hearing system comprising a first hearing device worn at first ear of a user and a second hearing device worn at a second ear of the user.

13 Claims, 4 Drawing Sheets

(56) References Cited

U.S. PATENT DOCUMENTS

| | | | | |
|---|---|---|---|---|
| 2016/0119725 A1* | 4/2016 | Mustiere | .............. | H04R 25/305 |
| | | | | 381/315 |
| 2017/0054528 A1* | 2/2017 | Pedersen | ................ | H04L 65/60 |
| 2017/0078807 A1* | 3/2017 | Mustiere | .............. | H04R 25/552 |
| 2020/0053460 A1* | 2/2020 | Pedersen | .............. | H04R 25/554 |
| 2020/0396028 A1* | 12/2020 | Haartsen | ................ | H04W 4/80 |

FOREIGN PATENT DOCUMENTS

| | | | | |
|---|---|---|---|---|
| EP | 3012834 A1 | 4/2016 | | |
| WO | 2008089784 A1 | 7/2008 | | |
| WO | WO-2009135872 A1 * | 11/2009 | ........... | H04R 25/552 |
| WO | 2014086388 | 6/2014 | | |
| WO | 2019129748 | 7/2019 | | |

OTHER PUBLICATIONS

Sinha, et al.,"Loss concealment for multi-channel streaming audio", NOSSDAV '03 [Proceedings of the international workshop on Network and Operating System Support for Digital Audio and Video], ACM, Monerey, CA, USA, Jun. 1, 2003, pp. 100-109.

* cited by examiner

METHOD AND SYSTEM FOR STREAMING
A MULTICHANNEL AUDIO SIGNAL TO A
BINAURAL HEARING SYSTEM

RELATED APPLICATIONS

The present application claims priority to EP Patent Application No. EP21180598, filed Jun. 21, 2021, the contents of which are hereby incorporated by reference in their entirety.

BACKGROUND INFORMATION

In wireless digital audio streaming links the audio data is transmitted as packets, containing audio data of one (in case of mono signals) or more channels (in case of multichannel signals) sampled during a certain time interval. For several reasons, such as electromagnetic interference, body shadowing, unfavorable head orientation, or Rayleigh fading signal drop due to rapid movement, the receiver may fail to correctly receive a given audio data packet, resulting in temporary loss of the audio signal to be reproduced by the receiving hearing device. In order to minimize audio packet loss, transmission of a given audio packet may be repeated; for example, each audio packet may be transmitted twice. In the event that reception of all copies of a given audio packet fails, the hearing device may use a packet loss concealment ("PLC") algorithm to interpolate the audio signal included in the most recently received audio packets and to predict from this interpolation what could be the audio data in the missed packet. Depending on the specific situation, audio artifacts may result when the audio signal interpolation or prediction by the PLC algorithm differs too much from the real audio signal.

One known option to cope with the problem of missed packets in wireless transmissions is that the receiver device requests the transmitter device to retransmit a missed packet; however, this option is not available in case of a broadcast streaming without acknowledgement, since in such case there is no way to request repetition of a packet. Another known option in binaural hearing systems is to have the contralateral hearing device forward a missed audio packet via a binaural link to the ipsilateral hearing device which missed reception of the packet from the streaming device. Such solution requires in case of a stereo signal that each hearing device permanently receives both channels to allow for retransmission of missed packets of the channel dedicated to the other device, what increases power consumption.

Generally, a stereo stream may be transmitted either as a single stream including both channels, with each of the hearing devices receiving both channels, or as two separate streams, with one stream only including one of the channels and the other stream including only the other channel. In the latter case each receiver device has to listen only to the packets containing the dedicated stream, thus saving battery power by minimizing listening time. However, as already mentioned above, since in this case the option of retransmission of packets missed by the ipsilateral device by binaural retransmission from the contralateral device is not available, packet loss is more critical.

WO 2008/089784 A1 relates to a binaural hearing system wherein a mono audio stream is normally received by both hearing devices and wherein in case that the reception quality at one of the ears is found to degrade the stream as received by the hearing device at the other ear is forwarded via a binaural link.

WO 2014/086388 A1 relates to a binaural hearing assistance system which receives a mono signal audio stream via a point-to-point link, such as a Bluetooth link, wherein according to one example one of the hearing devices is provided with the synchronization information of the point-to-point link between the other hearing device and the audio source device, so as to allow that hearing device to eavesdrop the point-to-point link of the other hearing device in case of packet loss by that hearing device.

U.S. Pat. No. 10,043,523 B1 relates to a multichannel audio system, such as a Bluetooth stereo headset or a wireless speaker system, comprising an audio source device transmitting a multichannel stream and a plurality of receiver devices, wherein to each receiver device a different one of the channels is associated for reproduction by that receiver device. A cross-correlation between channels is regularly determined, and in case that a receiver device misses reception of packets of its associated channel it may use audio packets of another one of the channels in a PLC scheme, if the similarity, as indicated by the cross-correlation, between the associated channel and that other channel is high enough. In order to allow for such type of PLC, each receiver device permanently listens to all channels.

BRIEF DESCRIPTION OF THE DRAWINGS

Hereinafter, examples of the invention will be illustrated by reference to the attached drawings, wherein.

DETAILED DESCRIPTION

Figure 1:
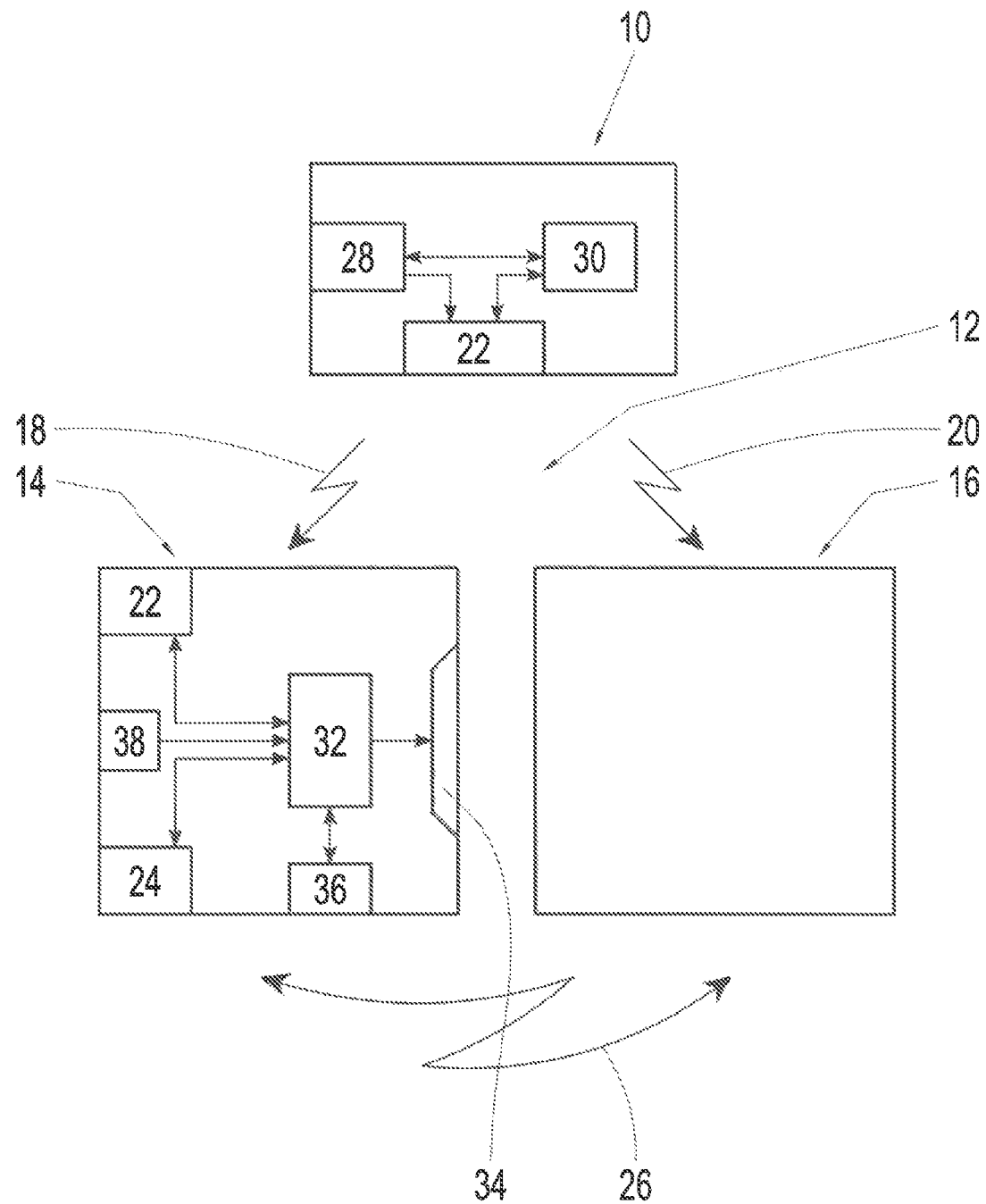
FIG. 1 is a schematic illustration of an example of a hearing system when used with an audio source device.

Described herein are a method and a system for streaming a multichannel audio signal, in particular a stereo signal, from an audio source device, such as a smartphone, to a binaural hearing system.

It is a feature described herein to provide for a method and system for streaming a multichannel audio signal from an audio source device to a binaural hearing system, wherein PLC capability is to be provided at relatively low resources needs.

The methods and systems described herein are beneficial in that, by operating each hearing device in a normal packet reception mode under stable link conditions where no packet loss occurs or is to be expected, in which mode each hearing device receives only audio packets containing audio data of its dedicated channel only, or in a packet loss reception mode under instable link conditions where packet loss occurs or is to be expected, in which, when a hearing device misses reception of an audio packet containing audio data of its dedicated channel, that hearing device uses an audio packet containing audio data of another one of the hearing devices as input to a PLC algorithm, reception times—and hence power consumption—can be minimized, while audio data which is usually quite similar to the lost audio data can be provided to the PLC algorithm for enhanced signal reconstruction.

According to one example, a hearing device switches from the normal packet reception mode into the packet loss reception mode once it is detected by that hearing device that an audio packet containing audio data of its dedicated channel is not received by that hearing device, or, in case of multiple packet transmission, that none of the transmissions of the same audio packet is received by that hearing device.

According to another example, each hearing device may monitor the quality of the link to the audio source device, such as by computing a bit error rate and/or a packet error rate and/or an RSSI readout, wherein the hearing device switches from the normal packet reception mode into the packet loss reception mode once it is detected by that hearing device that the link quality is below a predefined threshold.

According to one example, each hearing device switches from the packet loss reception mode to the normal packet reception mode once the determined link quality is found to be above the predefined threshold for a predetermined mode switching time period.

According to one example, in the packet loss reception mode the respective hearing device is configured to eavesdrop audio packets containing audio data of the other one of the channels. For example, the respective hearing device may open a reception window for receiving audio packets containing audio data of the other one of the channels during an expected transmission time period of such audio packets. To this end, the hearing device may be provided with the synchronization information of the link of the other hearing device with the audio source device.

According to another example, the respective hearing device in the packet loss reception mode may request via a binaural link from the other one of the hearing devices transmission of an audio packet containing audio data of the other one of the channels via the binaural link.

According to one example, the audio packets may be transmitted in an interleaved sequence from the audio source device, wherein an audio packet containing audio data of one of the channels is followed by an audio packet containing audio data of another channel.

According to one example, transmission of each audio packet may be repeated at least once.

According to one example, in the packet loss reception mode in addition to the audio packet containing audio data of said other one of the channels at least one previously received audio packet containing audio data of the dedicated channel may be used as input to the PLC algorithm for reproducing the audio signal by the respective hearing device.

According to one example, the treatment of the audio packet containing audio data of said other one of the channels by the PLC algorithm may be controlled based on at least one previously received audio packet containing audio data of the dedicated channel.

According to one example, the PLC algorithm may substitute a missing audio packet of one of the channels by the audio packet containing audio data of said other one of the channels in its audio output.

According to one example, the PLC algorithm may use cross-fading for substituting the missing audio packet by the audio packet containing audio data of said other one of the channels in its audio output.

According to one example, the PLC algorithm may use a splitting of the audio signal into a low frequency component and a high frequency component, and wherein the PLC algorithm treats the low frequency component and the high frequency component in different manners.

According to one example, the PLC algorithm may use a pitch estimation based on at least one previously received audio packet containing audio data of the dedicated channel, and wherein the pitch estimation is used to control the substituting by the audio packet containing audio data of the other one of the channels in a manner so as to pitch-wise align the audio signal resulting from the substitute audio packet.

According to one example, the PLC algorithm may use a classifier for determining an auditory scene from at least one previously received audio packet containing audio data of the dedicated channel, wherein the treatment of the audio packet containing audio data of the other one of the channels by the PLC algorithm is controlled according to the determined auditory scene.

According to one example, the PLC algorithm may use uses a similarity score of the audio signal of the dedicated channel and the audio signal of the other one of the channels. According to one example, the similarity score may be determined by cross-correlation, coherence estimation and/or dynamic time warping.

According to one example, a weight of the audio packet containing audio data of the other one of the channels and a weight of at least one previously received audio packet containing audio data of the dedicated channel may be used as input to the PLC algorithm are determined according to the similarity score. For example, in case of high similarity, more weight may be given to the audio data from the other one of the channels, whereas in case of low similarity more weight may be given to the audio data of the dedicated channel according to the audio packets received most recently prior to the packet loss.

According to one example, the similarity score may be determined by the audio source device, for example over a rolling window, and may be transmitted as metadata together with the audio data.

According to another example, the hearing devices in the normal packet reception mode may exchange audio data of their respective dedicated channels at certain points in time so as to estimate the similarity score.

According to one example, the multichannel audio signal is streamed using a Bluetooth protocol, including BT LE.

According to one example, the audio source device may be a smartphone, a tablet computer, a personal computer, a media player, a HiFi-streaming device or a TV-streaming device.

According to one example, the multichannel audio signal is a stereo signal, wherein the first channel is the right channel to be reproduced at the right ear and the second channel is the left channel to be reproduced at the left ear.

The present embodiments utilize the fact that typically the channels in a multichannel audio stream, in particular in stereo recordings, are quite similar during most of the time, so that the contralateral channel is a relatively good substitute of missing parts of the ipsilateral channel.

A "hearing device" as used hereinafter is any ear level device suitable for reproducing sound by stimulating a user's hearing, such as an electroacoustic hearing aid, a bone conduction hearing aid, an active hearing protection device, a hearing prostheses device such as a cochlear implant, a wireless headset, an earbud, an earplug, an earphone, etc.

An "audio source device" as used hereinafter is any device suitable for wirelessly transmitting an audio stream to the hearing devices.

An "audio packet" as used hereinafter is a packet containing audio data representative of a sample of an audio signal which can be reproduced by the hearing devices.

A "packet loss" as used hereinafter describes a situation when a hearing device fails to correctly receive a dedicated audio packet from the audio source device, or, in case of repeated transmission of the same audio packet, fails to correctly receive any transmission or retransmission of a dedicated audio packet from the audio source device.

A "dedicated channel" of a hearing device as used hereinafter is that one of the channels of a multichannel signal which has been previously associated with the receptive hearing device.

A "binaural hearing system" as used hereinafter is a binaural system which comprises a hearing device for each of the ears of a user.

It is noted that the "wireless links" as used hereinafter may use any suitable physical carrier; in particular, a frequency hopping scheme may be used, wherein the different packets and their repetitions may be transmitted at different RF frequencies.

FIG. 1 is a schematic illustration of a system for streaming a stereo audio signal from an audio source device 10 to a binaural hearing system 12 comprising a first hearing device 14 to be worn at a first ear of a user and a second hearing device 16 to be worn at a second ear of the user. The first hearing device 14 is connected to the audio source device 10 via a first audio link 18, and the second hearing device 16 is connected to the audio source device 10 via a second audio link 20. The hearing devices 14, 16 and the audio source device 10 are provided with respective wireless interfaces 22 for establishing the audio links 18, 20. Further, the hearing devices 14, 16 are provided with a wireless interface 24 for establishing a binaural wireless link 26 between the hearing devices 14, 16. It is to be understood that the interfaces 22 and 24 are only functionally separated and may (or not) actually share physical components like an antenna, etc.

The audio source device 10 comprises a controller 30 for controlling the audio source device 10 and an audio source 28, which supplies a stereo audio signal to the wireless interface 22 and the controller 30.

The audio source device 10 may be, for example, a smartphone, a tablet computer, a personal computer, a media player, a HiFi streaming device, a TV-streaming device, etc.

The hearing devices 14, 16 comprise an audio signal processing unit 32, a speaker 34 for reproducing audio signals provided by the audio signal processing unit 32 and a controller 36. The hearing devices 14, 16 may also include a microphone arrangement 38 for capturing ambient sound and/or the user's voice.

The hearing devices 14, 16 may be electroacoustic hearing aids, bone conduction hearing aids, active hearing protection devices, hearing prostheses devices, such as cochlear implants, a wireless headset, earbuds, earplugs, earphones, etc.

The stereo audio signal provided by the audio source 28 is transmitted by the audio source device 10 as a stream of audio packets, wherein each audio packet contains audio data of one of the two channels only, with an audio packet $L_i$ being representative of an audio sample of the left channel taken during a certain time interval $\Delta t_i$, and an audio packet $R_i$ being representative of an audio sample of the right channel taken during the time interval $\Delta t_i$. Thus, in the most simple case the audio stream would be a sequence of consecutive alternating samples of the right channel and the left channel (L1, R1, L2, R2, . . . ).

In practice, the sequence is more complex, since usually transmission of each audio packet is repeated at least once, so that in an interleaved sequence the stream structure would be as follows: L1, R1, L1, R1, L2, R2, L2, R2, L3, . . . . Alternatively, a non-interleaved scheme may be used, which in the present example would be: L1, L1, R1, R1, L2, L2, R2, R2, L3, . . . .

It is to be understood that the audio packets 40 are distributed onto the first link 18 and the second link 20 in such a manner that the first link 18 transmits only, for example, the left channel packets, i.e. L1, L2, L3, . . . , whereas the second link 20 transmits only the right channel packets R1, R2, R3, . . . in the sense that the first hearing device 14 listens only to the transmission slots in which a left channel audio packet is to be expected and the second hearing device 16 listens only during the time slots in which transmission of a right channel packet R1, R2, R3, . . . is to be expected.

Consequently, in a normal packet reception mode, in which no audio packets are lost, the first hearing device 14 receives only audio packets containing audio data of the left channel, while the second hearing device 16 receives only audio packets which contain audio data of the right channel only. This link structure allows for low current consumption of the wireless interface 22 of the hearing devices 14, 16 in the normal packet reception mode.

The links 18, 20 typically are implemented as broadcasting links, so that the hearing devices 14, 16 cannot request retransmission of not received audio packets from the audio source device 10.

The binaural link 26 may be used for exchanging binaural information, including audio data, between the two hearing devices 14, 16.

Under stable link conditions, wherein no packet loss occurs or is expected, the hearing devices 14, 16 operate in a normal packet reception mode, in which usually no audio packets are finally lost (by "finally lost" it is meant that neither the first transmission of certain audio packet, nor any repetition transmissions of the same audio packet is received by the respective hearing device).

Figure 2:
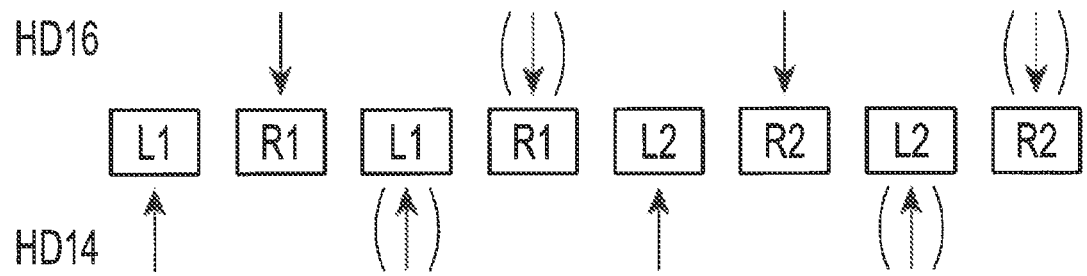
FIG. 2 is a schematic illustration of a first example of an audio packet link structure during normal packet reception.

An example of the reception behavior of the hearing devices 14, 16 in the normal packet reception mode is shown in FIG. 2, according to which there is an interleaved transmission of the left and right channel with one repetition transmission of each audio packet, wherein the hearing devices 14, 16 usually listen only during the expected first transmission of the audio packet containing audio data of its dedicated channel (the listening actions are indicated by arrows in FIGS. 2 to 4); only in case that the first transmission of the respective audio packet is not correctly received by the hearing device, the respective hearing device will in addition listen to the expected second transmission of the same audio packet. Thus, in the normal packet reception mode each hearing device listens only to the first transmission (or, if the first transmission is not received, to the second transmission; such conditional listening is indicated by brackets in FIGS. 2 to 4) of each audio packet containing audio data of its dedicated channel. Thereby, the stream of the stereo audio signal is actually split into two separate streams/links, one for each channel.

Figure 3:
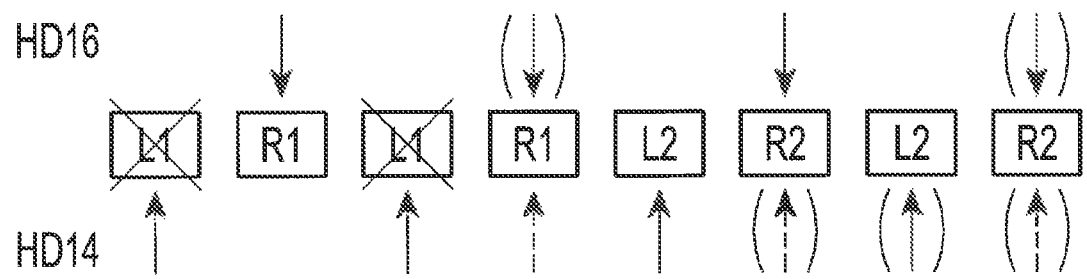
FIG. 3 is a schematic illustration of the audio packet link structure of FIG. 2 during disturbed packet reception.

FIG. 3 illustrates an example of a situation in which the left ear hearing device 14 does not Fcorrectly receive the first and second transmission of its dedicated audio packet L1 (i.e., an audio packet containing audio data of the dedicated channel, which here is the left channel), so that the audio packet L1 is finally lost for the left ear hearing device 14.

According to one embodiment, the left ear hearing device 14, in response to the detection that it finally did not receive a dedicated audio packet, may switch into a packet loss reception mode, in which it seeks to compensate somehow for the loss of the audio packet L1.

According to an alternative embodiment, a hearing device may switch into the packet loss reception mode once it is detected by said hearing device that the quality of its dedicated audio link 18, 20 is below a predefined threshold, which condition is indicative of that packet loss is likely. For example, a hearing device may compute a bit error rate, a packet error rate and/or a RSSI readout for determining the link quality. The hearing device may switch back to the normal packet reception mode once the determined link quality is found to be above the predefined threshold for a predetermined mode switching time period, for example after 1 to 10 seconds.

In the embodiment in which switching into the packet loss reception mode is triggered by the detection of a final loss of a dedicated audio packet, the respective hearing device may switch back into the normal packet reception mode once no final loss of a dedicated packet has been detected for a predetermined mode switching time period.

Figure 4:
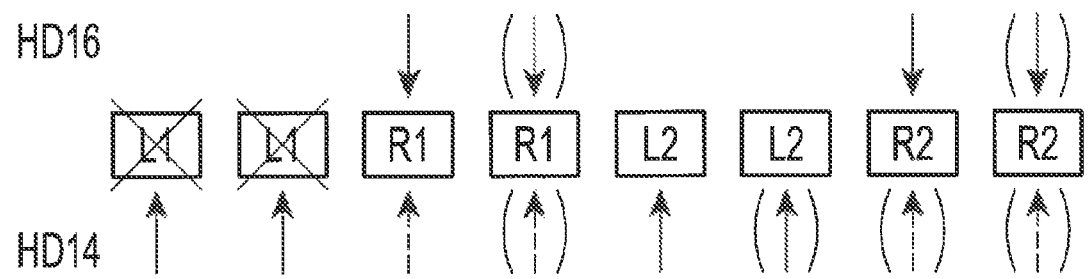
FIG. 4 is a schematic illustration of a second example of an audio packet link structure during disturbed packet reception.
Figure 5:
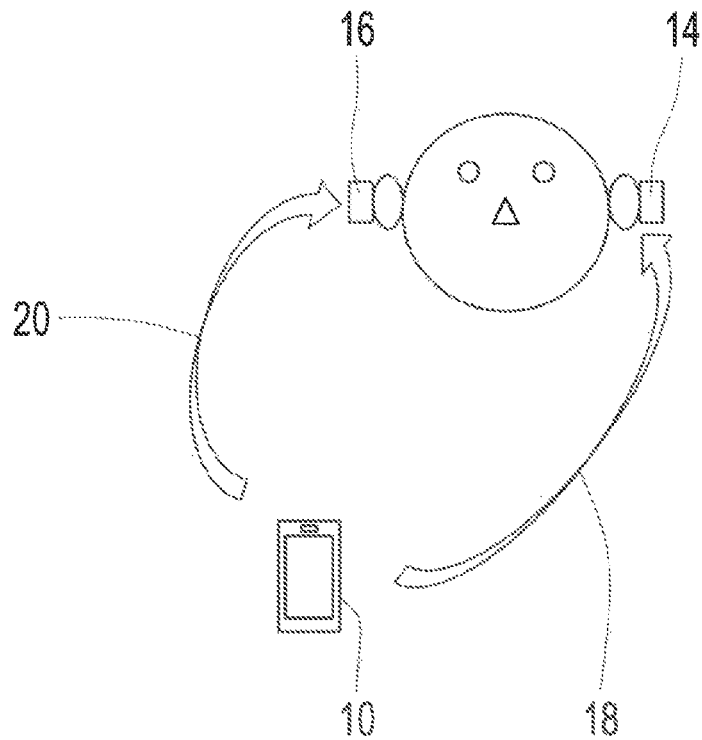
FIG. 5 is a schematic illustration of a binaural hearing system of when both hearing devices operate in a normal packer reception mode.
Figure 6:
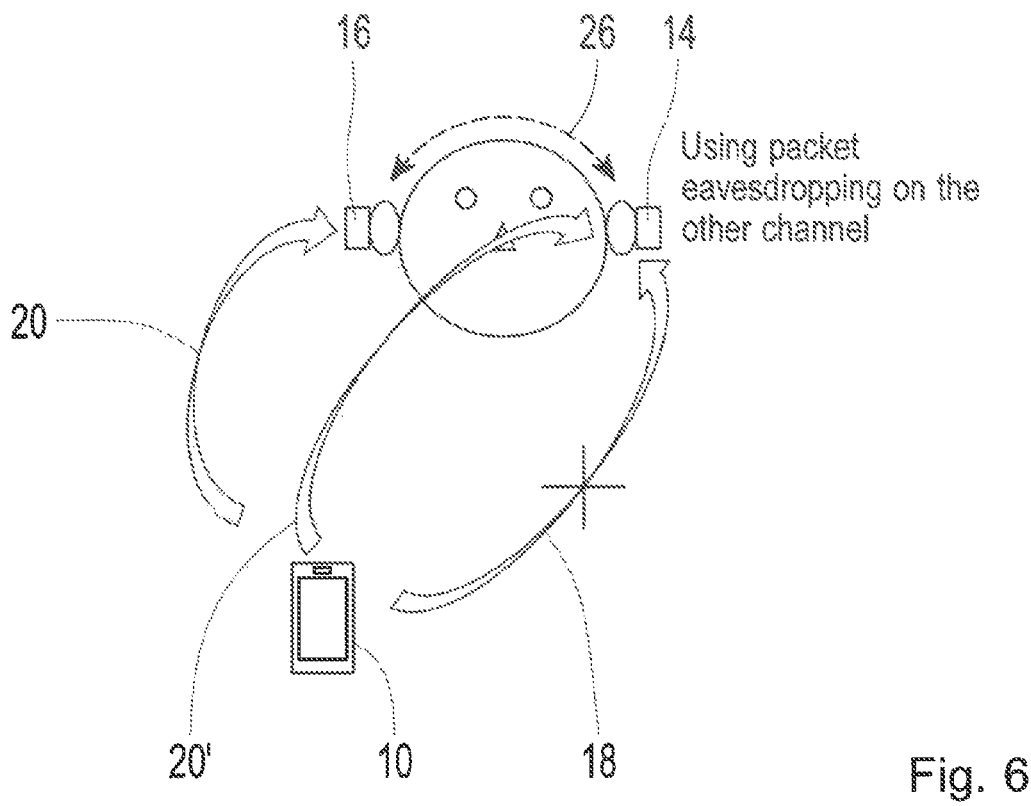
FIG. 6 is a schematic illustration of a first example of the implementation of a packet loss reception mode in the system of FIG. 5.

According to one implementation of the packet loss reception mode, which is illustrated in FIG. 6, the respective hearing device (the left ear hearing device 14 in the example of FIGS. 3 and 6) tries to eavesdrop audio packets containing audio data of the other one of the channels by listening (i.e., by opening a corresponding reception window; such eavesdropping listening actions are indicated by dashed arrows in FIGS. 3 and 4) for audio packets containing audio data of the other one of the channels during the expected transmission slots of the audio packets of containing audio data of the other channel. Such eavesdropping of the other channel requires that each hearing device is provided with the synchronization information for the channel/link, which is to be eavesdropped (in FIG. 6 the eavesdropping of the right ear link 20 by the left ear hearing device 14 is indicated by 20').

In the example of FIG. 3, the left ear hearing device 14 in the packet loss reception mode listens for the audio packet R1 of the other channel (right channel) transmitted in the other stream/link 20. Such listening for receiving audio packets of the other channel may be continued as long as the respective hearing device is in the packet loss reception mode.

When the hearing device in the packet loss reception mode is successful in receiving the audio packet of the other channel (which packet corresponds to the lost dedicated audio packet in that it has been sampled during the same time period as the lost packet, but contains audio data of the other channel), the audio data contained in that packet is used as input to a PLC algorithm implemented in the audio signal processing unit 32 of the respective hearing device (here: left ear hearing device 14) as kind of substitute for the lost dedicated audio packet.

According to another implementation of the packet loss reception mode, the respective hearing device requests, via the binaural link 26, the other hearing device to transmit an audio packet containing audio data of the other channel via the binaural link 26, so that the requesting hearing device can receive that audio packet. In the example of FIG. 3, in this implementation the left ear hearing device 14 would request the right hearing device 16 via the binaural link 26 to transmit the audio packet R1 after reception by the right ear hearing device 16 via the binaural link 26 to the left ear hearing device 14.

For a given hearing device, the physical conditions for reception of audio packets from the audio source device 10 (via the links 18 or 20), on the one hand, and for reception of audio packets from the other hearing device via the binaural link 26, on the other hand, usually are different. Hence, it can be expected that for a given audio device reception of audio packets via the binaural link 26 from the other hearing device may be still possible even if for certain physical reasons, such as body shadowing or adverse head orientation, the hearing device is not able to receive audio packets from the audio source device 10 (since also the physical conditions for the other, contralateral hearing device for receiving audio packets from the audio source device 10 are different than for the ipsilateral hearing device, the contralateral hearing device still may be able to receive audio packets from the audio source device 10 even if the ipsilateral hearing device fails to do so). Consequently, audio packet forwarding from the contralateral side via the binaural link 26 still may work in cases in which eavesdropping of contralateral audio packets sent from the audio source device 10 via the contralateral link does not work.

Consequently, according to one implementation, the packet loss reception mode may be implemented in such a manner that the respective hearing device first tries to receive contralateral audio packets by eavesdropping of the other link and then, if this attempt fails, requests forwarding of contralateral packets from the other hearing device via the binaural link 26.

Figure 7:
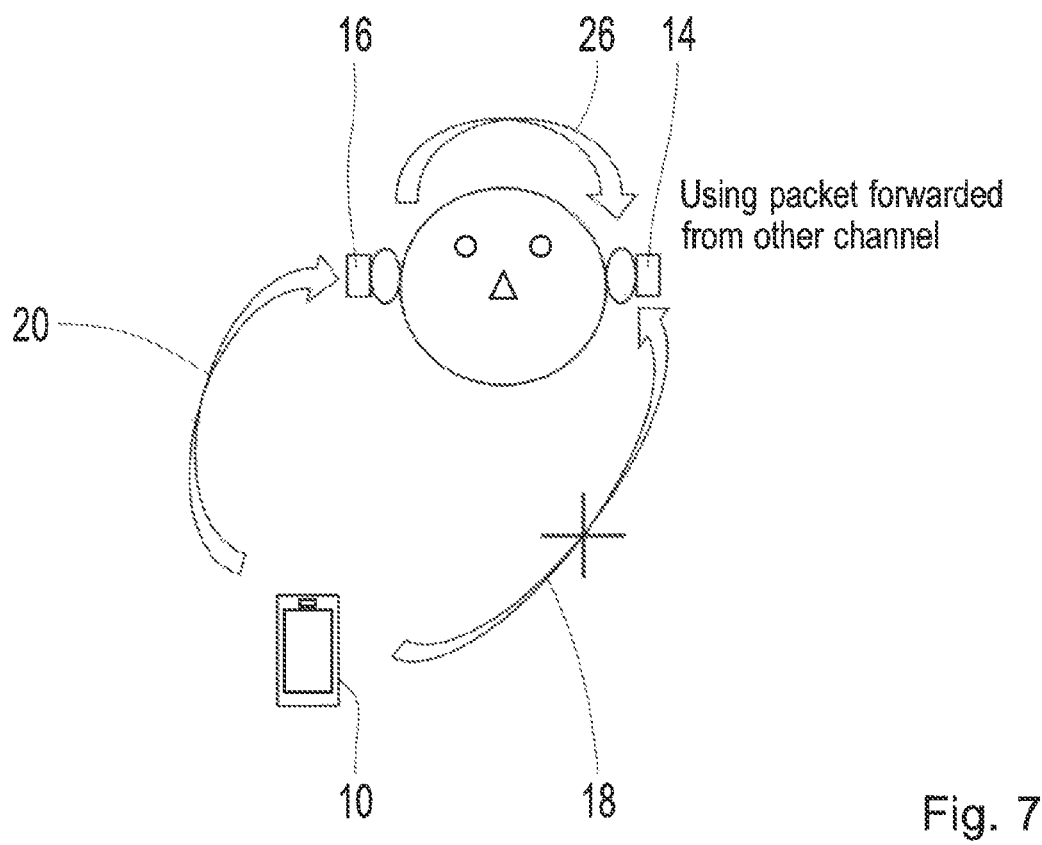
FIG. 7 is a schematic illustration of a second example of an implementation of a packet loss reception mode in the system of FIG. 5.

An example of the eavesdropping implementation is schematically illustrated in FIG. 6, while an example of the packet forwarding implementation of the packet loss reception mode is schematically illustrated in FIG. 7.

As an alternative to the interleaved packet transmission scheme shown in FIG. 3, the example of a non-interleaved packet transmission scheme is shown in FIG. 4, wherein the first and second transmissions of a certain packet of one channel is followed by the first and second transmissions of the corresponding packet of the other channel. As in the example of FIG. 3, it is assumed that reception of the two transmissions of the packet L1 by the left ear hearing device 14 fails.

While in the examples of FIGS. 3 and 4 it is assumed that reception of the packet of that channel which is transmitted first in each frame fails, in this case no preemptive listening to the other channel is necessary for—at least theoretically—still capturing the corresponding audio packet of the other channel.

The situation is different when reception of the audio packets which are transmitted second in each frame (in the examples of FIGS. 3 and 4 this would mean that reception of the two transmissions of the packet R1 by the right ear hearing device 16) fails. In this case, for the non-interleaved scheme without preemptive listening to the transmissions of the corresponding left channel packet L1 by the right ear hearing device 16 there would no chance for the right ear hearing device 16 to capture the packet L1 as a substitute for the lost dedicated packet R1.

As already mentioned above, preemptive listening for audio packets of the other channel may be initiated once the likelihood for loss of dedicated packets is above a certain threshold, as indicated by the link quality. Also for the interleaved transmission scheme of FIG. 3 the right ear hearing device 16 would not be able to capture the contralateral packet L1 as a substitute for a lost dedicated packet R1 when it starts to listen for contralateral packets once also the reception of the second transmission of the packet R1 fails.

As an alternative to "full" preemptive listening, the respective hearing device may switch into the packet loss reception mode and starts to listen for contralateral audio packets already once the first transmission of the dedicated packet cannot be received.

There are several options of how the contralateral audio packet may be used as a substitute for the lost ipsilateral audio packet in the PLC algorithm. The most simple use of the contralateral audio packet would be to replace the lost ipsilateral audio packet by the corresponding contralateral audio packet by "drop-in" of the audio data of the contralateral packet in the temporal place of the missing audio data of the ipsilateral packet, wherein some sort of suitable smoothing of the signal at the beginning and at the end of the sample corresponding to the lost packet is necessary to "connect" the replacement audio signal segment by the original ipsilateral audio signal without noticeable artifacts. This can be realized, for example by applying cross-fading, for example with a duration of about 4 to 5 ms. When the ipsilateral audio signal is back, i.e., when the dedicated ipsilateral audio packets are received again, another cross-fading may be applied to the ipsilateral signal to the previously used replacement signal.

While simple replacement of the lost dedicated audio packet by the corresponding contralateral audio packet may reasonably work in some cases, in particular if the audio signal in the two channels is very similar, the concealment result usually may be improved by using in the PLC algorithm not only the contralateral audio packet as a substitute for the lost dedicated audio packet but in addition also information from the most recently previously received ipsilateral audio packets, so that actually information from both channels can be used for the PLC algorithm.

For enhanced implementations of the PLC algorithm, one may implement, for example, features used in the PLC algorithms of the G722 standard. For example, the audio signal may be split into a low frequency component and in a high frequency component, wherein the PLC algorithm treats the low frequency component and the high frequency component in different manners. Further, a pitch estimation based on the most recently received ipsilateral audio packets may be used for "aligning" the substitute contralateral audio signal to the previously received ipsilateral audio signal. This applies in particular to the high frequency content. According to another example, the PLC algorithm may use a classifier for determining a present auditory scene from the most recently received ipsilateral audio signal, wherein the treatment of the substitute contralateral audio signal may be controlled in an appropriate manner according to the determined auditory scene; for example, precise alignment of the signal may be more important in certain auditory situations compared to others.

General, the treatment of the substitute contralateral audio data in the PLC algorithm may be controlled based on the most recently received dedicated (ipsilateral) audio data, so as to optimize the substitution procedure.

In particular, it may be helpful in this regard to take into account the present similarity between the channels when applying the PLC algorithm. To this end, the PLC algorithm may use a similarity score which is indicative of the present similarity of the audio signal of the two channels. For example, the similarity score may be determined by cross-correlation, by coherence estimation and/or by dynamic time warping.

According to one example, the similarity score may be used for determining a weight of the substitute contralateral audio data and the most recently received ipsilateral audio data. In particular, in case of a high similarity score, less weight has to be given to the ipsilateral audio signal, so that a relatively simple replacement of the missing ipsilateral audio signal by the substitute contralateral audio signal is effective, whereas for relatively low similarity score a higher weight has to be given to the ipsilateral audio signal (more precisely, to the extrapolation of the ipsilateral signal based on the most recently received ipsilateral audio data), so as to avoid artifacts resulting from a simple replacement of the missing ipsilateral audio signal by the substitute contralateral audio signal (such simple replacement would correspond to weight of 1.0/100% given to the contralateral signal, whereas replacing the missing ipsilateral audio signal by an interpolation would correspond to a weight pf 0.0/0% given to the contralateral signal).

According to one embodiment, the similarity score may be determined by the audio source device 10 and may be transmitted as metadata together with the audio data in the streams 18, 20. In particular, the similarity score may be determined by the audio source device over a rolling window. Since the similarity score usually may highly fluctuate over time, depending on the audio content, it should be computed in regular intervals.

An alternative embodiment, the similarity score may be estimated locally via the hearing devices (or by one of the hearing devices, which may transmit the determined similarity score via the binaural link 26 to the other hearing device). To this end, the hearing devices need to exchange appropriate data from time to time (audio data or data derived from the audio data, such as spectral cues or meta data), so that the hearing devices (or at least one of the hearing devices) can compare the present audio signals of the two channels.

In the extreme case, in which only one of the channels can be received by at least one of the hearing devices, while the other channel cannot be received, the binaural system 12 then would actually switch to the "best channel", namely that one which can be still received, for both ears, corresponding to a monaural signal formed by the receivable channel.

While the embodiments described herein will be typically used for stereo audio signals, it may in principle also used for multi-track systems, like "5.1 surround sound". The selection of the "substitute channel" for such multi track systems may be more elaborate and can be based, for example, on a channel similarity score, as described in U.S. Pat. No. 10,043,523 B1.

What is claimed is:

1. A method for streaming a multichannel audio signal comprising a first channel (L) and a second channel (R) from an audio source device to a binaural hearing system comprising a first hearing device worn at first ear of a user and a second hearing device worn at a second ear of the user; the method comprising:

establishing a first wireless link between the audio source device and the first hearing device and a second wireless link between the audio source device and the second hearing device;

transmitting, from the audio source device, the multichannel audio signal as audio packets via the first and second wireless links, the first channel being transmitted on the first wireless link and the second channel being transmitted on the second wireless link, the audio packets including first audio packets transmitted on the first wireless link containing audio data of the first channel only and second audio packets transmitted on the second wireless link containing audio data of the second channel only; and receiving the audio packets by each of the hearing device and reproducing, by each of the hearing devices, an audio output from the received audio packets;

wherein each hearing device is operated either in
　a normal packet reception mode under stable link conditions in which no audio packet loss occurs or is to be expected, or
　in a packet loss reception mode under instable link conditions in which packet loss occurs or is to be expected for the respective hearing device, wherein in the normal packet reception mode the first hearing device receives only audio packets containing audio data of the first channel as its dedicated channel for reproducing its audio output, and the second hearing device receives only audio packets containing audio data of the second channel as its dedicated channel for reproducing its audio output, and wherein in the packet loss reception mode the hearing device which misses reception of an audio packet containing audio data of its dedicated channel uses an audio packet containing audio data of another one of the channels as input to a packet loss concealment (PLC) algorithm for reproducing its audio signal;

wherein each hearing device switches from the normal packet reception mode into the packet loss reception mode (i) once it is detected by that hearing device that an audio packet containing audio data of its dedicated channel (L, R) is not received by that hearing device, or in case of multiple packet transmission, that none of the transmissions of the same audio packet is received by that hearing device, and/or (ii) once it is detected by that hearing device that a quality of its link with the audio source device, as determined by that hearing device, is below a predefined threshold.

2. The method of claim 1, wherein each hearing device computes a bit error rate and/or a packet error rate and/or an RSSI readout for determining the quality of its link with the audio source device.

3. The method of claim 1, wherein each hearing device switches from the packet loss reception mode to the normal packet reception mode once the determined quality of its link with the audio source device is found to be above the predefined threshold for a predetermined mode switching time period.

4. The method of claim 1, wherein in the packet loss reception mode the respective hearing device eavesdrops audio packets containing audio data of said other one of the channels (R, L).

5. The method of claim 4, wherein in the packet loss reception mode the respective hearing device opens a reception window for receiving an audio packet containing audio data of said other one of the channels (R, L) during a transmission slot of audio packets containing audio data of said other one of the channels.

6. The method of claim 4, wherein each of the hearing devices is provided with synchronization information of the link of the other one of the hearing devices with the audio source device so as to enable said eavesdropping of audio packets containing audio data of said other one of the channels.

7. The method of claim 1, wherein in the packet loss reception mode the respective hearing device requests, via a binaural link, from the other one of the hearing devices transmission of an audio packet containing audio data of said other one of the channels (R, L) via the binaural link.

8. The method of claim 1, wherein the audio packets are transmitted in an interleaved sequence from the audio source device, and wherein an audio packet containing audio data of one of the channels (L, R) is followed by an audio packet containing audio data of another channel (R, L).

9. The method of claim 1, wherein in the packet loss reception mode in addition to the audio packet containing audio data of said other one of the channels (R, L) at least one previously received audio packet containing audio data of the dedicated channel (R, L) is used as input to the packet loss concealment (PLC) algorithm for reproducing the audio signal by the respective hearing device.

10. The method of claim 1, wherein a treatment of the audio packet containing audio data of said other one of the channels (R, L) by the PLC algorithm is controlled based on at least one previously received audio packet containing audio data of the dedicated channel (L, R).

11. The method of claim 1, wherein the PLC algorithm uses a similarity score of the audio signal of the dedicated channel (L, R) and the audio signal of said other one of the channels (R, L).

12. The method of claim 11, wherein a weight of the audio packet containing audio data of said other one of the channels (R, L) and a weight of at least one previously received audio packet containing audio data of the dedicated channel (L, R) used as input to the PLC algorithm are determined according to the similarity score.

13. A binaural hearing system comprising a first hearing device to be worn at first ear of a user and a second hearing device to be worn at a second ear of the user;

wherein each hearing device is configured to receive audio packets of multichannel audio signal comprising a first channel (L) and a second channel (R) and transmitted by an audio source device via a first wireless link established between the audio source device and the first hearing device and a second wireless link established between the audio source device and the second hearing device, respectively, each audio packet containing audio data of one of the channels only, and to reproduce an audio output from the received audio packets;

wherein each hearing device is configured to be operated either in a normal packet reception mode under stable link conditions in which no audio packet loss occurs or is to be expected or in a packet loss reception mode under instable link conditions in which packet loss occurs or is to be expected for the respective hearing device, wherein in the normal packet reception mode the first hearing device is configured to receive only audio packets containing audio data of the first channel as its dedicated channel for reproducing its audio output and the second hearing device is configured to receive only audio packets containing audio data of the second channel as its dedicated channel for reproducing its audio output, and wherein in the packet loss reception mode the hearing device which misses reception of an audio packet containing audio data of its dedicated channel is configured to use an audio packet containing audio data of the other channel as input to a packet loss concealment (PLC) algorithm for reproducing its audio signal;

wherein each hearing device switches from the normal packet reception mode into the packet loss reception mode (i) once it is detected by that hearing device that an audio packet containing audio data of its dedicated channel (L, R) is not received by that hearing device, or in case of multiple packet transmission, that none of the transmissions of the same audio packet is received by that hearing device, and/or (ii) once it is detected by that hearing device that a quality of its link with the audio source device, as determined by that hearing device, is below a predefined threshold.

* * * * *